United States Patent
Winkler

[11] Patent Number: 5,879,100
[45] Date of Patent: Mar. 9, 1999

[54] COUPLING ELEMENT FOR HAND LEVER MECHANISM

[76] Inventor: John Winkler, 3247 S. Eldorado Dr., New Berlin, Wis. 53151

[21] Appl. No.: 761,978

[22] Filed: Dec. 11, 1996

[51] Int. Cl.[6] .................................................... B25G 3/18
[52] U.S. Cl. .............................. 403/325; 403/17; 403/97; 16/114 R
[58] Field of Search .................................. 403/17, 13, 97, 403/91, 298, 325, 359, 117, 145; 81/58, 58.3, 58.4, 58.1; 16/114 R, 121, 251

[56] References Cited

U.S. PATENT DOCUMENTS

| | | | |
|---|---|---|---|
| 2,236,313 | 3/1941 | Goodenough et al. | 81/58 X |
| 2,452,742 | 11/1948 | Franzene | 403/321 |
| 2,603,325 | 7/1952 | Pickard | 81/58.3 |
| 2,607,253 | 8/1952 | Gearhart | 81/58 |
| 2,862,746 | 12/1958 | Deliso | 403/359 |
| 3,250,148 | 5/1966 | Soles | 16/114 R |
| 3,691,876 | 9/1972 | Cassidy, Jr. | 81/58.1 |
| 3,865,500 | 2/1975 | Newell | 403/359 |
| 3,890,672 | 6/1975 | Berthagen | 403/145 X |
| 3,945,274 | 3/1976 | Annett, II | 81/58.1 |
| 4,161,891 | 7/1979 | Bossert | 16/114 R |
| 4,460,204 | 7/1984 | Olsen | 16/114 R |
| 4,598,614 | 7/1986 | Kipp | 81/58.3 |
| 4,854,143 | 8/1989 | Corder et al. | 70/218 |
| 4,929,113 | 5/1990 | Sheu | 403/325 |
| 5,371,919 | 12/1994 | Winkler | 16/114 R |
| 5,443,471 | 8/1995 | Swajger . | |
| 5,533,232 | 7/1996 | Boyer | 16/114 |

FOREIGN PATENT DOCUMENTS

GM7618755  10/1976  Germany .................. B25B 5/16

*Primary Examiner*—Kenneth J. Dorner
*Assistant Examiner*—William L. Miller
*Attorney, Agent, or Firm*—Whyte Hirschboeck Dudek SC

[57] ABSTRACT

The present assembly provides a coupling element for an adjustable hand lever mechanism. The coupling element having an disk shaped body, an extension and a projection. The disk shaped body has a D-shaped opening extending longitudinally therethrough. The coupling element may be made from a material, e.g., metal, that is harder than the material, e.g., plastic, from which the hand lever is made. The extension of the coupling element protrudes radially outward from the outer circumference of the disk shaped body. The projection is situated outside the disk shaped body of the coupling element and extends upward from the upper surface of the extension in a direction substantially parallel to the D-shaped opening of the disk shaped body. The D-shaped opening allows for ease of manufacturing by using a die having a D-shaped core for molding a hand lever about a coupling element. The D-shape ensures that the extension of the coupling element will be accurately oriented within the handle of the hand lever prior to and during the molding process.

13 Claims, 3 Drawing Sheets

COUPLING ELEMENT FOR HAND LEVER MECHANISM

BACKGROUND OF THE INVENTION

This invention relates to a coupling element for a hand lever mechanism. More particularly this invention relates to a metallic coupling element used in combination with a non-metallic handle in order to form a hand lever mechanism where the metallic coupling element is designed to ensure safe, consistent molding of the coupling element within the handle. The invention also relates to a method of molding a metallic coupling element within a non-metallic handle.

Adjustable hand lever mechanisms and similar items are well known in the clamping, fastener and hand lever art. These devices are used in applications in which frequent, multiple adjustments and/or clampings are required, e.g., on various industrial equipment where tools are not practical due to space or cost restrictions. Typically, these mechanisms may attach to a spindle, shaft or similar device. As such, the adjustable hand lever mechanism must be able to rotatably engage and disengage the device to be rotated.

Various hand lever mechanisms are described by Kipp in U.S. Pat. No. 4,598,614 which is incorporated herein by reference. Kipp addresses adjustable hand lever mechanisms comprising a non-metallic hand lever and a metallic coupling element. Kipp explains that cost and weight considerations favor a nonmetallic, preferably a plastic, hand lever mechanism, but torque considerations favor a metallic coupling element since this element almost always engages a metallic fastening element. As further described by Kipp, if the hand lever mechanism is to be useful for its intended purpose, then the metallic coupling element must be incorporated into the non-metallic handle in such a manner that one does not rotate with respect to the other during operation of the hand lever mechanism. Kipp addressed this concern by designing the coupling element to have an annular configuration equipped with anchoring elements, e.g., projecting elements arranged uniformly along the outer periphery of the coupling element. These anchoring elements are imbedded in the hand lever and, as such, resist rotation of one about the other during operation of the hand lever mechanism. While this design may be generally effective for its intended purpose, alternative coupling designs are desirable for a number of reasons including cost of manufacture, ease of assembly, operational effectiveness, quality assurance in molding, protection of dies, the ability to manufacture it from metals not as susceptible to corrosion and/or contaminating food, medical devices, etc., such as stainless steel. Of particular interest are coupling elements that allow for convenient alignment and support of such a coupling element within a handle prior to and during molding. For the foregoing reasons, there is a need for a coupling element that can be molded into a handle in an accurate, safe and inexpensive manner.

BRIEF SUMMARY OF THE INVENTION

The present invention is a coupling element of disk shaped configuration for incorporation into an adjustable hand lever mechanism that is designed to allow the coupling element to be rotationally aligned and supported within a handle prior to and during molding. The coupling element having an disk shaped body with a D-shaped opening. An extension protrudes radially outward from the outer circumference of the disk shaped body. In addition, a projection which is located outside the disk shaped body, protrudes out from the upper surface of the extension, preferably, in a direction substantially parallel to the D-shaped opening.

The present invention is also directed to a hand lever mechanism where the coupling element just described is molded within a plastic hand lever.

In addition, this invention is also directed to an adjustable hand lever mechanism that also comprises the coupling element having a D-shaped opening molded into a handle. The coupling element is also designed to engage a fastening element in such a manner as to effect rotation of the fastening element when rotational force is applied to the handle. The adjustable hand lever mechanism also comprises a screw, having a screw head, extending through the coupling element and threadedly engaged in the fastening element. The design of the coupling element ensures a fixed relationship between it and the handle when the coupling element is molded within the handle. The projection on the coupling element is designed to minimize stress in the handle when rotational force is applied to operate the mechanism. The coupling element may be made from a material that is harder than the material from which the handle is made.

A method of manufacturing an adjustable hand lever mechanism is also incorporated in the present invention. This method includes providing the coupling element with the D-shaped opening. A die with a D-shaped core is also provided. The D-shaped opening of the coupling element is located about the D-shaped core of the die. Finally, a hand lever is molded about the coupling element whereby the D-shaped core maintains alignment of the extension within the hand lever during molding.

These and other features, aspects, and advantages of the present invention will become better understood with reference to the following description, appended claims, and accompanying drawings.

DETAILED DESCRIPTION OF THE INVENTION

Like numerals are employed to designate like parts throughout the drawings.

Figure 1:
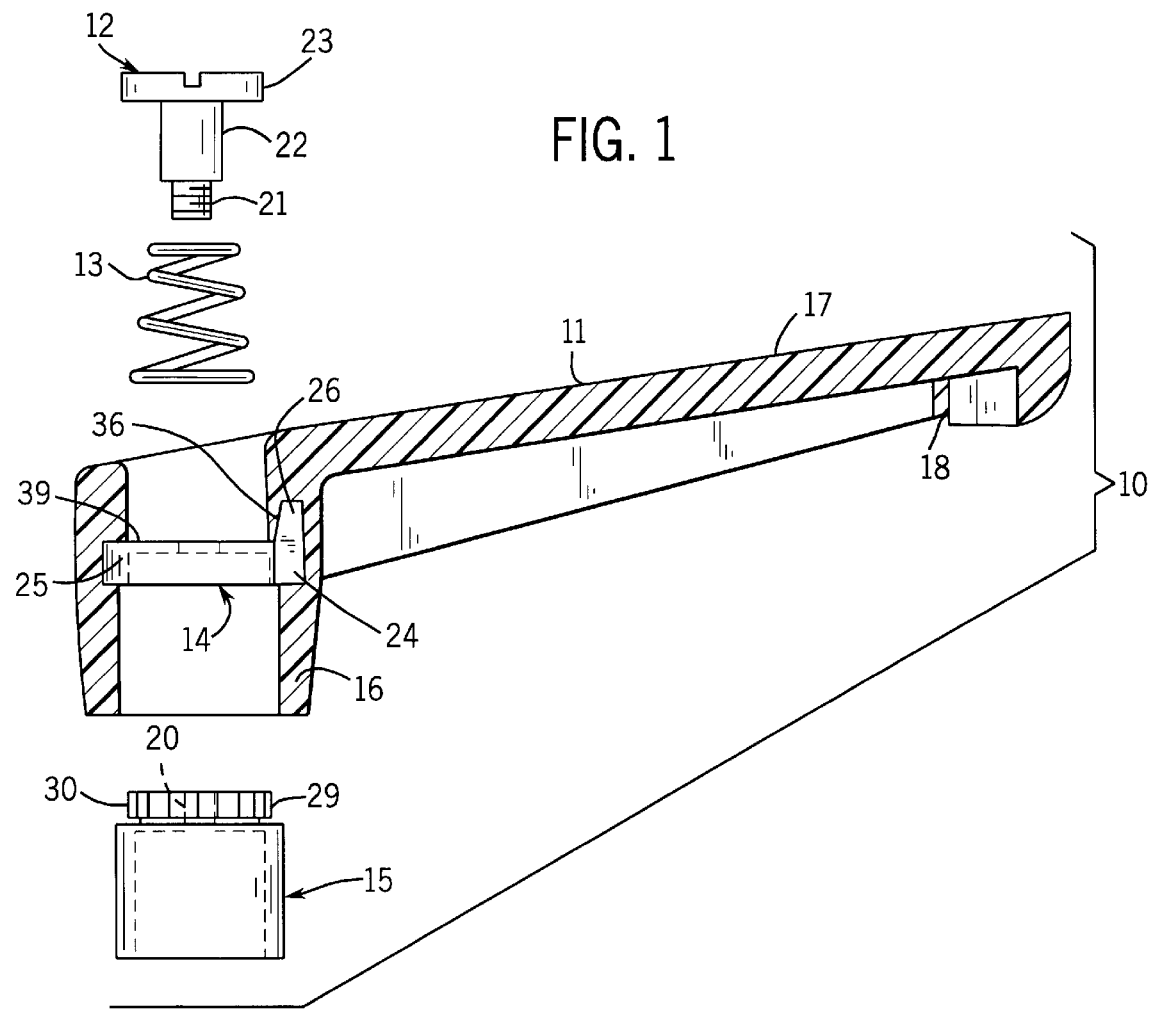
FIG. 1 is an exploded sectional view of one embodiment of an adjustable hand lever mechanism of this invention.
Figure 2:
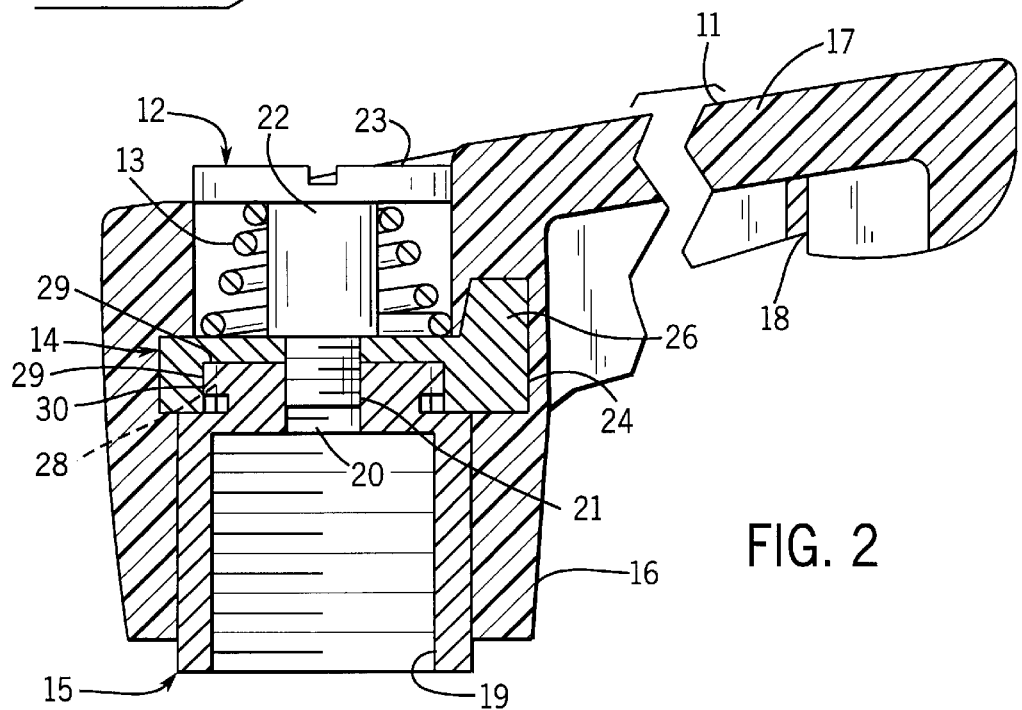
FIG. 2 is an assembled sectional view of the side of the adjustable hand lever mechanism.
Figure 3A:
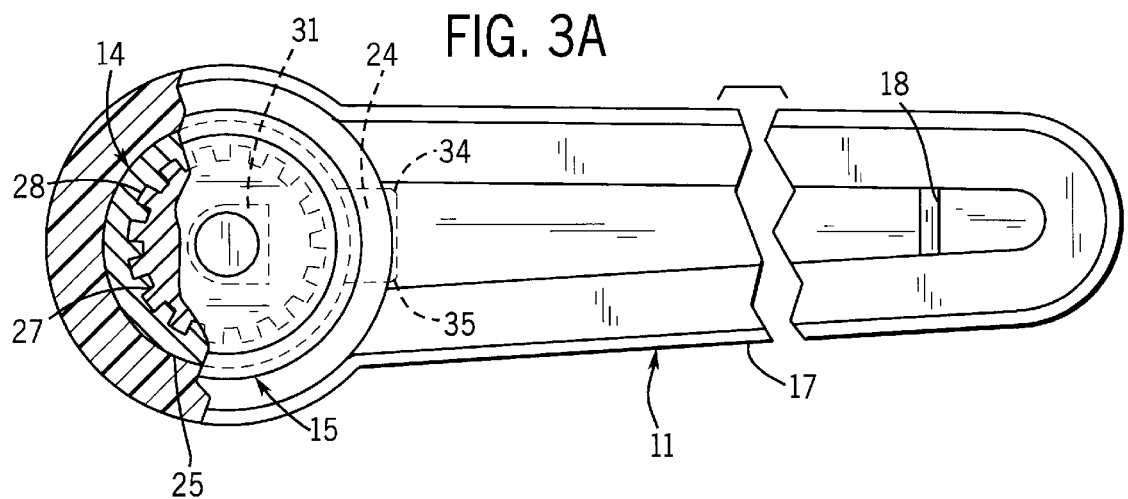
FIG. 3A is an assembled partial section view of the bottom of the adjustable hand lever mechanism of FIG. 2.
Figure 3B:
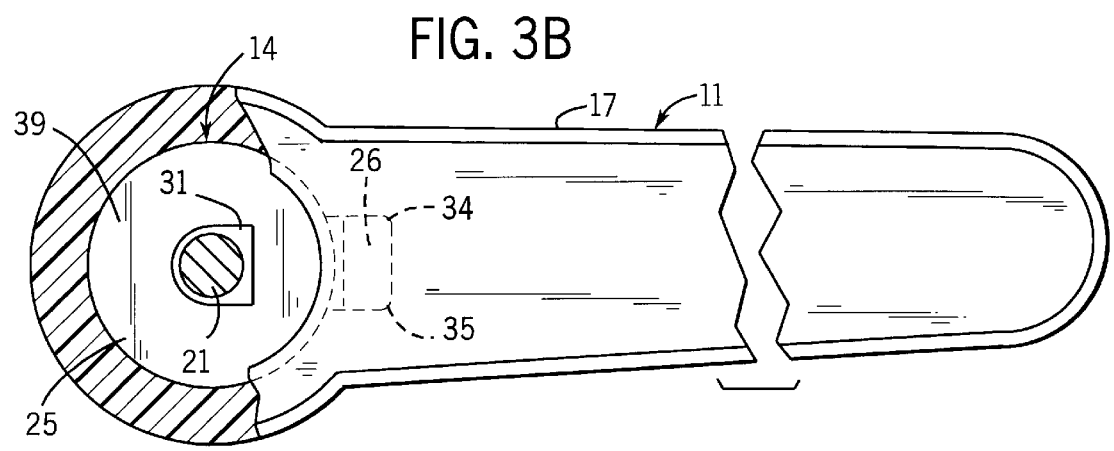
FIG. 3B is an assembled partial section view of the top of the adjustable hand lever mechanism of FIG. 2.

In FIG. 1, an adjustable hand lever mechanism 10 is shown in exploded detail comprising hand lever 11, screw 12, spring 13, coupling element 14 and fastening element 15. Hand lever 11 is an integral, one piece casting comprising a sleeve 16 and a grip handle 17. Handle 17 is reinforced at its distal end by intermediate wall 18. Hand lever 11 may be made of a material which is soft relative to the material from which coupling element 14 is made, and it is preferably made from a plastic which in its cured form is rigid and durable. The plastic can and preferably does contain an inner filler, e.g., fiberglass, carbon black, to obtain various physical properties, e.g., strength, surface finish, and/or aesthetic appeal. Fastening element 15 is shaped to fit within sleeve 16 of hand lever 11. There are a variety of designs available for fastening element 15. Typically, fastening element 15 has an internal cavity with female screw threads 19 adapted to receive the end of a spindle, shaft or like device equipped with male screw threads at one end. The size and length of the threads, and the length of the spindle, shaft or similar device can vary widely. At the upper end of the cavity of fastening element 15 are female screw threads 20, which extend over a shorter length of fastening element 15 and define a smaller cavity diameter than female screw threads 19. Female screw threads 19 of fastening element 15 are adapted to threadably receive threaded shank 21 of screw 12. Screw 12 has a non-threaded shank 22 immediately above threaded shank 21. Screw 12 is designed to fit within conical compression spring 13 such that upper section of spring 13 bears against the underside of screw head 23 and the lower section of spring 13 bears upon coupling element 14 as illustrated in FIG. 2.

In another embodiment of this invention the fastening element 15 has a male threaded member extending downwardly from it instead of the cavity with female screw threads 20.

Figure 4A:
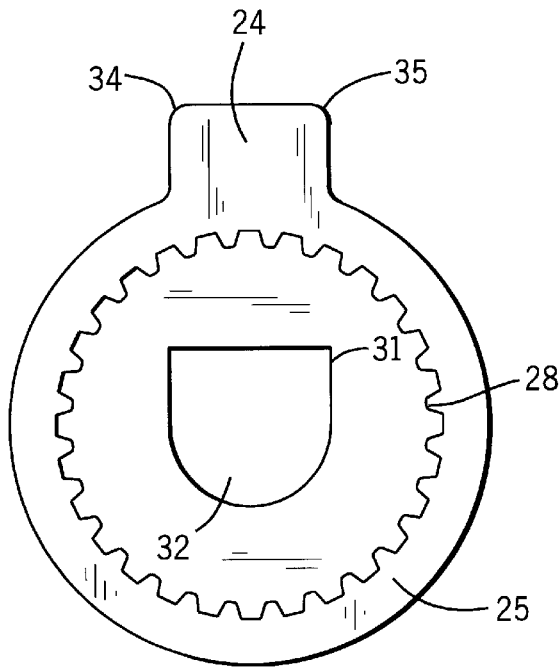
FIG. 4A is a top view of the coupling element of FIG. 1.
Figure 4C:
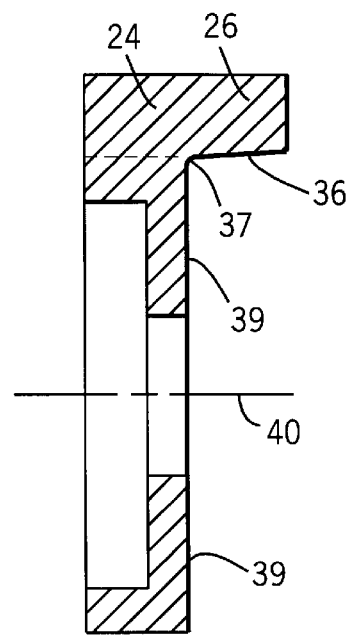
FIG. 4C is a side sectional view of the coupling element of FIG. 1.
Figure 4B:
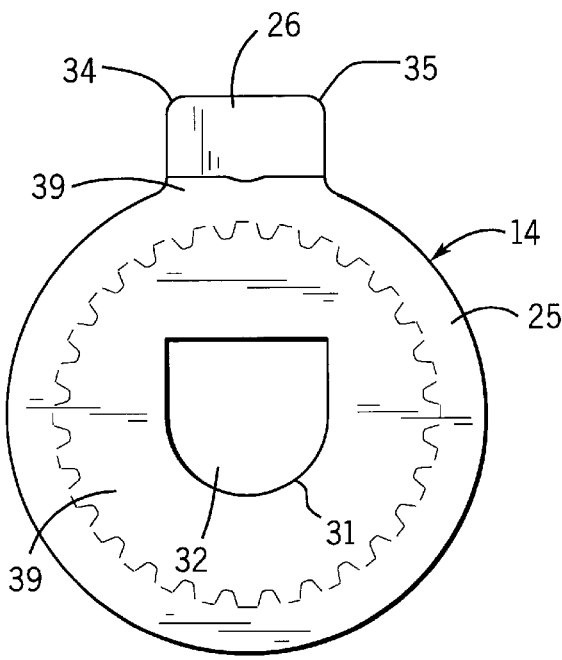
FIG. 4B is a bottom view of the coupling element of FIG. 1.

Coupling element 14, shown in detail in FIGS. 4A, 4B and 4C, is made of a material which is hard relative to the material from which hand lever 11 is made, and preferably is made from metal, such as zinc, carbon steel, stainless steel, etc., or a material with metal-like properties relative to deformation resistance, e.g., engineering plastics, various composites such as ceramic/metal composites, and the like. Coupling element 14 is fixed within hand lever 11 in such a manner that one will not rotate relative to the other when adjustable hand lever mechanism 10 is in clamping operation. Coupling element 14 is fixed to hand lever 11 by imbedding coupling element 14 into hand lever 11 during the manufacturing process, typically during injection molding of the hand lever 11.

In FIG. 4A, 4B, and 4C, coupling element 14 has a disk shaped body with an extension 24 protruding radially from disk shaped body 25. In addition, coupling element 14 has a D-shaped opening 31 through disk shaped body 25. There is a projection 26 outside disk shaped body 25 extending from upper surface 39 of extension 24 in a direction substantially parallel to D-shaped opening 31. Projection 24 does not extend into disk shaped body 25 of coupling element 14.

In this preferred embodiment of the invention, extension 24 is generally rectangular. The two distal edges 34, 35 of projection 26 and extension 24 are rounded. In addition, inside surface 36 nearest annular body 25 is beveled to facilitate removal of coupling element 14 from a mold.

In this preferred embodiment of the invention, edge 37 (where beveled surface 36 and upper surface 29 communicate) may be rounded.

Figure 5:
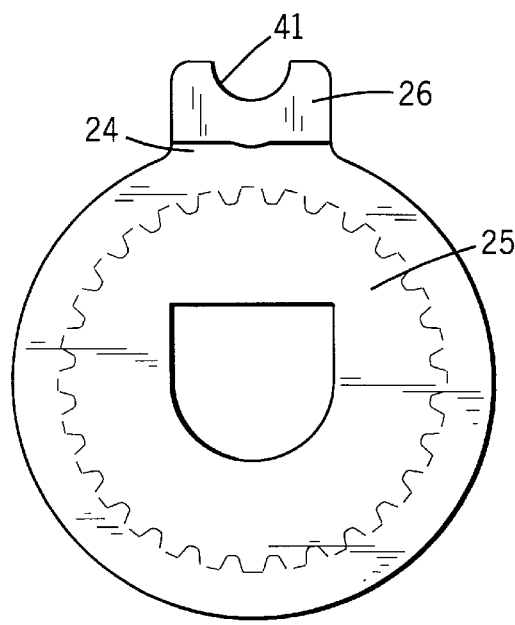
FIG. 5 is a top view of another embodiment of the coupling element.

In a preferred embodiment of the invention, extension 24 may have a channel 41, preferably crescent shaped, as shown in FIG. 5, along the distal outside surface of projection 26 and extension 24 running substantially parallel to D-shaped opening 31.

In another preferred embodiment of the invention, coupling element 14 has a coupling members for mating with fastening element 15 which preferably comprises a rim 27 having inwardly extending gear teeth 28 as shown in FIG. 4B. The flanks of gear teeth 28 are extended generally parallel to a turning axis of a spindle or similar device (not shown) which is to be connected with fastening element 15.

When rim 27 has inwardly extending gear teeth 28, fastening element 15 has complimentary coupling element 29 formed on the upwardly pointing end of fastening element 15. Complimentary coupling element 29 is preferably shaped in the form of a pinion having gear teeth 30 extending radially which correspond in shape, size and pitch to teeth 28 of rim 27, and which are adapted to engage with teeth 28. Teeth 30 are forcibly engaged with teeth 28 by spring 13. Thus, hand lever 11 and fastening element 15 are rotatably coupled with each other by engagement of coupling element 14 and complimentary coupling element 29. The coupling and uncoupling of fastening element 15 and coupling element 14 is accomplished in the same manner as described in U.S. Pat. No. 5,371,919, incorporated herein by reference. Preferably, coupling element 14 is made of a material at least as hard as the material of complimentary coupling element 29.

The method of the present invention involves locating the D-shaped opening 31 of coupling element 14 about a D-shaped core (not shown) in a die used to mold coupling element 14 within hand lever 11. Placing coupling element 14 about a D-shaped core ensures that coupling element 14 is in the proper position prior to molding and as a result extension 24 is rotationally aligned with handle 17.

When extension 24 is properly aligned within handle 17, maximum support is provided to handle 17 when hand lever 11 is rotated in both directions. This support is critical because hand lever 11 may be made of a softer material. When extension 24 has been molded offset within handle 17, inadequate support may be supplied to handle 17 when hand lever 11 is rotated in a particular direction. In addition, the alignment of coupling element 14 within the die prior to molding is important because if the die closes and coupling element 14 is not seated in the proper position, extensive damage to the die will result. A misaligned part can therefore lead to expensive tooling repairs and significant down time which can be costly to a manufacturer.

Use of a design involving a D-shaped core prevents rotational and lateral movement of coupling element 14 during molding. The only additional support required for coupling element 14 is in the transverse direction (i.e. the direction the die opens and closes) requiring a simple die design as is well known in the art, leading to reduced tooling costs.

Although the invention has been described in detail by the figures, this detail is for purposes of illustration only and is not intended as a limitation upon the spirit and scope of the appended claims.

The invention claimed is:

1. An adjustable hand lever mechanism adapted for turning a device about an axis, the adjustable hand lever mechanism comprising:

a coupling element having a one-piece construction comprising a disk shaped body, an extension and a projection, the disk shaped body having an axis and a circular outer circumference and the disk shaped body having a D-shaped opening therethrough, the extension protruding radially outward from the outer circumference of the disk shaped body and the extension having an upper surface, the projection extending upwardly from the upper surface of the extension and positioned outside the outer circumference of the disk shaped body, a hand lever comprising a handle and a sleeve molded about the coupling element, the handle attached to and extending from the sleeve and the extension of the coupling element positioned in coinciding rotational alignment with the handle, a fastening element adapted to engage the coupling element such that when the coupling element and fastening element are engaged and a rotational force is applied to the handle, the fastening element rotates in the direction of the rotational force without the coupling element and the handle rotating relative to one another; and a screw, having a screw head, extending through the coupling element and threadedly engaged in the fastening element.

2. The adjustable hand lever mechanism according to claim 1 further comprising a helical spring between the head of the screw and the coupling element for urging the coupling element and the fastening element in rotative engagement with each other.

3. The adjustable hand lever mechanism according to claim 1 wherein the projection of the coupling element is generally rectangular.

4. The adjustable hand lever mechanism according to claim 3 wherein the projection has an inside surface nearest the disk shaped body, the inside surface being beveled to facilitate removing the coupling element from a mold.

5. The adjustable hand lever mechanism according to claim 4 wherein an edge where the beveled surface communicates with the upper surface of the extension is rounded.

6. The adjustable hand lever mechanism according to claim 1 wherein the projection and the extension form an outside surface distal to the disk shaped body, the outside surface having two rounded edges.

7. The adjustable hand lever mechanism according to claim 6 wherein the extension has a channel along an outer surface, the channel being subsantially parallel to the axis of the disk shaped body.

8. The adjustable hand lever mechanism according to claim 7 wherein the channel is crescent shaped.

9. The adjustable hand lever mechanism according to claim 1 wherein the coupling element has coupling members distributed along a periphery thereof, the coupling members being formed on a side of the coupling element facing the fastening element and formed as a toothed rim with the coupling members facing radially inward and the fastening element has a complementary coupling element engaging the coupling members of the coupling element, the complementary coupling element being formed as a pinion having complementary coupling members directed outward and shaped to engage the teeth of the toothed rim of the coupling element, the coupling element and the complementary coupling element being capable of engaging and disengaging by relative movement of the coupling element or the complementary coupling element in a direction of the axis of the disk shaped body.

10. The adjustable hand lever mechanism according to claim 9 wherein the coupling members are gear teeth.

11. A method of manufacturing the hand lever mechanism of claim 1 comprising the steps of:

providing a die having a D-shaped core for molding the hand lever;

locating the D-shaped opening of the coupling element about the D-shaped core within the die;

molding the hand lever about the coupling element whereby the D-shaped core provides for coinciding rotational alignment of the extension within the handle during molding.

12. The method of claim 11 wherein the molding step comprises injection of a thermoformable composition into the die at an elevated temperature.

13. The method of claim 12 wherein the thermoformable composition comprises a polymer resin.

* * * * *